Aug. 23, 1927.
R. H. RANGER
1,639,667
METHOD FOR RADIO POSITION FINDING
Filed March 8, 1924
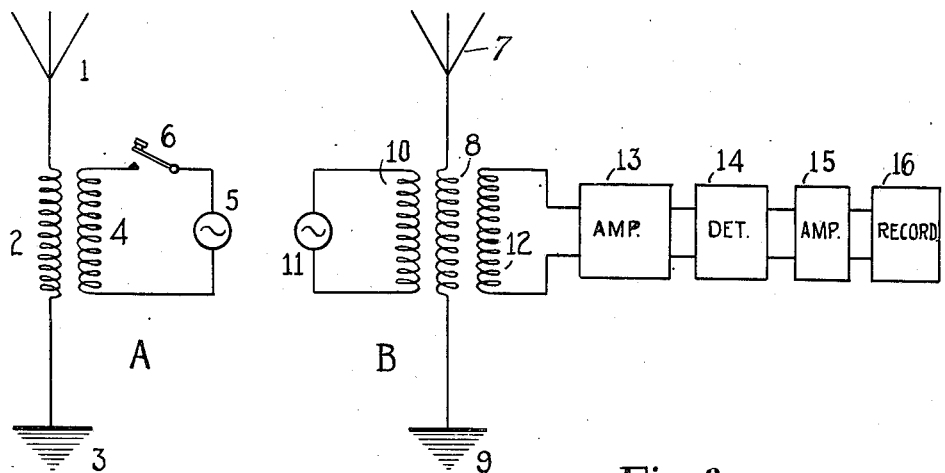
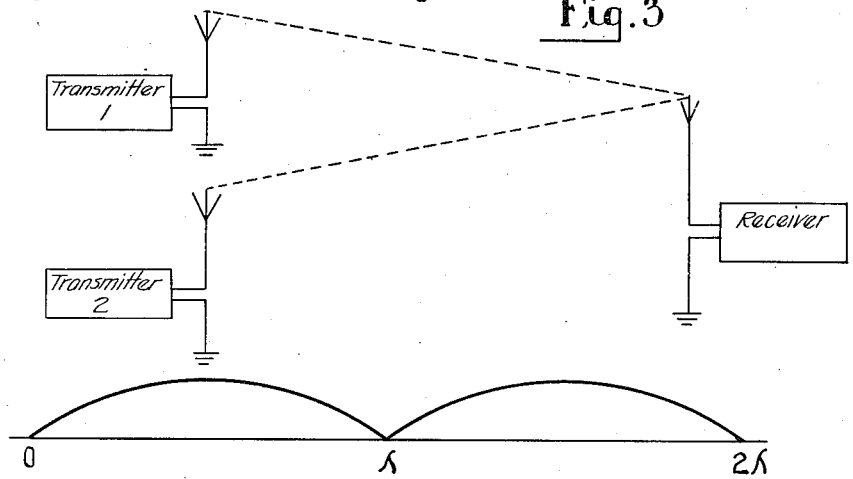
Inventor
RICHARD H. RANGER
By his Attorney Patented Aug. 23, 1927.

1,639,667

UNITED STATES PATENT OFFICE.

RICHARD HOWLAND RANGER, OF BROOKLYN, NEW YORK, ASSIGNOR TO RADIO CORPORATION OF AMERICA, A CORPORATION OF DELAWARE.

METHOD FOR RADIO POSITION FINDING.

Application filed March 8, 1924. Serial No. 697,800.

This invention relates to improvements in direction and position finding apparatus, more particularly adapted for use on moving vehicles, such as ships, aircraft, etc., although the same is not limited to use thereon, and it contemplates an apparatus and method whereby the position of such a vehicle may be found with ease and rapidity regardless of atmospheric conditions and to a greater accuracy than is possible with present apparatus.

It is an object of this invention to provide a new and improved position finding method and means for carrying out the same whereby position may be determined with great accuracy.

It is another object of this invention to provide a position finding method and apparatus which may be utilized independently of weather conditions to obtain position to a high degree of accuracy.

It is a further object of this invention to provide new and improved method and apparatus for determining position without involving mathematical computations or taking bearings.

Still other objects of my invention will be apparent from the specification.

The novel features which I believe to be characteristic of my invention are set forth in the appended claims; the invention itself however both as to its organization and method of operation will best be understood by reference to the following description taken in connection with the accompanying drawing, in which Fig. 1 represents radio transmitting and receiving apparatus for carrying out my invention;

Fig. 2 represents a curve such as would be obtained from the recorder shown in Fig. 1; and Fig. 3 discloses diagrammatically, a system wherein two transmitting stations are used to carry out my invention.

Various suggestions have been made in the past for utilizing radio transmission and reception for the purpose of finding position. Possibly the best known of these methods consists in utilizing directional reception. In carrying out such a method bearings may be taken of two transmitting stations, the distance between which is known. From this data the position of the observer can be found. It is obvious, however, that in order to determine position by this method, directional receiving apparatus of great sensitivity and accuracy must be provided.

It has also been suggested that position may be determined by comparing the intensity of signals from one or more transmitting stations with a standard. In this method it is assumed that the attenuation of signals follows a definite law and that, knowing the strength of signal received at any point, it is possible to determine the distance between the transmitting station and the observer. If this assumption were correct, it would then follow that the observer's position might be found by determining his distance from two transmitting stations, provided the distance between the two transmitting stations is known.

As a matter of fact, however, this system is entirely useless for obtaining position since it is well known that many conditions influence the strength of signal received from any transmitting station independently of the distance between the observer and the station. It, therefore, follows that it is impossible even to approximate the distance between the observer and the transmitter by comparing signal strength with any standard.

My invention is able to overcome the difficulties of prior systems by utilizing certain phenomena which are not affected by distance of the observer from the transmitter if he is able to receive signals at all.

My invention also eliminates the necessity for using directional receiving apparatus, although the same may of course be used if desired to eliminate troublesome interference.

In practicing my invention, I utilize a phenomenon of radio reception similar to the phenomenon known in acoustics as Doeppler's principle.

It is well known to physicists that the apparent frequency or pitch of sound varies according to the rate of change of distance between the source of the sound and the position of the observer, and certain of these phenomena are also well known to the laymen. For instance, an observer on a moving train passing a bell, whistle or other source of sound will observe a drop in the pitch of the bell or other source of sound as the train passes by the same. The generally accepted explanation of this phenomenon is that the motion of the observer with respect to the source of sound results in an increase or decrease in the number of sound waves falling upon the ear of the observer per unit of time which, of course, is interpreted by the ear as a change in the pitch of the sound.

I have discovered that a similar phenomenon exists with respect to radio waves. For instance, if an observer is at a fixed distance from a transmitting station, transmitting at a constant frequency, the frequency of the transmitted wave will be found by the observer to be constant. If, however, he moves toward the transmitter, the frequency of the transmitted waves will appear to increase, and conversely if he moves away, the frequency will appear to decrease. I have utilized this principle in providing for a novel position finder, as will be more particularly described hereinafter.

Referring to Fig. 1, A represents a transmitter of any suitable type. As shown herein, 1 represents an antenna comprising a coil 2 and grounded at 3. Coupled to the coil 2 there is provided a second coil 4 energized by suitable oscillator 5 which may, for example, be an alternator provided, if desired, with a key 6 for signalling purposes. The receiving apparatus B, which may be of any suitable type, comprises, as herein shown, an aerial 7 having therein a coil 8 and grounded as at 9. Coupled to this coil 8 there is provided a second coil 10 adapted to be energized by a suitable oscillator 11. Also coupled to the coil 8 is provided a coil 12 for feeding a suitable amplifier 13. It to be understood, however, that as much or as little amplification may be utilized as is deemed necessary under the circumstances.

The output of amplifier 13 is supplied to detector 14. Additional amplification may be obtained from amplifier 15 suitable for amplifying the output of detector 14 whatever the frequency of the beats produced may be. For example, a direct current amplifier construction, well known in the art, provides a suitable arrangement for amplifying any beat frequency, whether it be small or large.

For the purpose of carrying out my invention, it is necessary that oscillators 5 and 11 be both of relatively constant frequency. Methods and apparatus are well known in the art for obtaining constant frequency. For instance, it is known that the Alexanderson alternator may be regulated to have a variation of not more than one part in 2500. If still greater accuracy of position is desired, other means are known for obtaining much greater constancy, among which may be mentioned special oscillators whose frequency is fixed, as by a tuning fork.

In the operation of my invention, oscillators 5 and 11 will be operated at a constant frequency and as near the same frequency as is practicable. It will be understood that if the frequency of oscillators 5 and 11 is the same and the receiver is located at a fixed distance from the transmitter, no signal will be obtained. If, however, the frequency of one of the oscillators varies from the frequency of the other, beats will be produced between these frequencies, amplified, detected and recorded.

Now, let us assume that the transmitting station A is fixed in position, say at some point on land, and that receiver B is located upon a ship. Let us assume also that the ship is stationary at a distance of one wave length from the transmitting station. It is then apparent that signals arriving at the receiver will be dephased 360° from the signals at the transmitter. If we assume that the ship is at a distance of two wave lengths from the transmitter, signals will be dephased 720° from those at the transmitter etc. It is also evident that if the ship starts from a position one wave length distant from the transmitter and steams to a position two wave lengths distant, the phase relation between the incoming and the locally generated oscillations will shift by 360°, and a single complete beat will thereby be produced, which when rectified and recorded by recorder 16 it will appear as shown in Fig. 2.

It is evident that each of the loops shown in Fig. 2 represents that the observer has passed through a distance equal to a wave length of the transmitted signal. The time necessary for the recorder to produce one of these loops is, of course, dependent upon the speed with which the observer travels toward or away from the transmitter but the distance between zero points, nevertheless, always represents a wave length distance. It is, therefore, evident that if the transmitter is operated constantly and the receiver also operated constantly, the change of distance from the receiver to the transmitter may be calculated by counting the number of loops and fractions thereof recorded on the tape. This number multiplied by the wave length of the transmitter gives the distance which the observer has travelled.

For instance, assuming that station A, located in New York, is transmitting at 20,000 meters. If station B is located on a ship leaving New York Harbor and proceeding east, it will be observed that when the ship has proceeded a distance of 20,000 meters from New York, the tape will show 1 loop, at 40,000 meters, it will show two loops, etc. This gives the distance over which the ship has travelled to an accuracy dependent only upon the error in the frequency of the transmitter and receiver, and as pointed out above, it is quite possible to maintain these frequencies so nearly constant the distance may be determined with a high degree of accuracy.

In order to utilize this method for obtaining position as well as distance, it is only necessary to have two systems such as shown in Fig. 1, wherein the two transmitters are located a known distance apart, preferably a relatively large distance. It will be apparent that if one receiver is operated in response to waves received from one transmitter and the other receiver operated in response to waves from the other transmitter, the change of distance with respect to both transmitters may be determined as pointed out above. If then the distance between the two transmitters themselves and the distance between the observer and both transmitters at the start is known, we have the length of each of three sides of a triangle, and by suitable calculation or by laying the same out upon a chart, the position of the observer can be readily found.

While I have herein shown and described the recording as taking place upon a vehicle, it is evident that stations A and B, for instance, may be reversed; that is to say, that the vehicle may operate as a transmitter and recording may be made at the station whose position is fixed. This method of operation would be of particular advantage in determining the location of aircraft etc. for obvious reasons. The position of the aircraft or vehicle would then be determined at the fixed station and transmitted in any suitable way to the vehicle.

It may also be pointed out that it is not necessary that the frequency of the two oscillators be the same, since as long as both are substantially constant, the number of beats produced per unit of time may be calculated and corrected for, as for any other constant and known error.

Also, an arrangement may be provided in which the relative movement with respect to the transmitter may be determined. In producing such an arrangement it is only necessary to provide that the frequencies of the transmitter and receiver shall normally beat with a predetermined frequency. If the transmitter frequency is above that of the receiver frequency, the pitch of the beat will appear to rise as the receiver moves toward the transmitter and will appear to drop as the receiver moves away from the transmitter. If the transmitter frequency is below the receiver frequency, conditions will be reversed.

It is also possible to deterine resultant speed toward or away from the transmitter with such an arrangement. To obtain this result, it is only necessary to provide suitable means for determining the change in frequency of the beats from the frequency produced when the distance between transmitter and receiver is constant. This may be done, for instance, by providing that the beats shall be within the range of audibility and providing a calibrated tuning circuit which may be tuned for maximum response to the beat frequency. The tuning circuit should be calibrated so that the change in the tuning necessary to produce maximum response would indicate the rate of change of distance to the transmitter. The same result may also be obtained by the use of an additional oscillator which may be adjusted to produce zero beat with the beat produced between the transmitted and local oscillations, the tuning of the additional local oscillator being calibrated in the same manner as described above.

While I have referred to the use of a local oscillator throughout for producing beat with the incoming wave, it is obvious that other apparatus may be substituted to produce the same effect. For instance, a synchronous detector, tone wheel or chopper may be used for the purpose of producing heterodyne effects.

While I have shown and described certain forms of my invention so that it may be practiced and its benefits obtained, it is obvious that changes and modifications may be made without departing from its teachings and scope, as will be evident to those skilled in the art.

Having described my invention, what I claim is:

1. A method of determining distance or position of a radio receiver with reference to a plurality of stationary transmitters operating at substantially constant frequency which consists in receiving said transmitted frequencies, combining with each of said received frequencies currents of substantially constant frequency adapted to produce beats therewith when the transmitter and receiver have been relatively moved a predetermined distance, rectifying and recording such beats and determining the position of the receiver by obtaining the distance from said transmitters from the record of such beats and finding position therefrom.

2. The method of determining distances or positions of a radio receiver with reference to a plurality of definitely spaced fixed points which includes transmitting a signal from each station of a substantially constant frequency, receiving each of said signals at a receiver, combining with each of said signals at the receiver currents of substantially constant and the same frequency as transmitted from each station, producing beats between each of said frequencies upon a relative movement between said fixed points and the receiver, rectifying and recording the beats produced and obtaining position and distance of said receiver from said stations from the record of the said beats.

RICHARD HOWLAND RANGER.